(12) United States Patent
Campbell

(10) Patent No.: US 7,198,103 B2
(45) Date of Patent: Apr. 3, 2007

(54) METHOD FOR STIMULATING A PETROLEUM WELL

(76) Inventor: Gale J. Campbell, 107B Balboa Dr., Broussard, LA (US) 70518

( * ) Notice: Subject to any disclaimer, the term of this patent is extended or adjusted under 35 U.S.C. 154(b) by 187 days.

(21) Appl. No.: 10/828,612

(22) Filed: Apr. 21, 2004

(65) Prior Publication Data

US 2006/0011341 A1    Jan. 19, 2006

(51) Int. Cl.
*A47B 43/00*      (2006.01)
(52) U.S. Cl. .................................. 166/279; 166/263
(58) Field of Classification Search ............. 166/270.1, 166/263, 279
See application file for complete search history.

(56) References Cited

U.S. PATENT DOCUMENTS

| | | | |
|---|---|---|---|
| 2,862,558 A | | 12/1958 | Dixon |
| 4,101,425 A | * | 7/1978 | Young et al. ............... 507/260 |
| 4,775,489 A | * | 10/1988 | Watkins et al. ............. 507/202 |
| 2004/0176263 A1 | * | 9/2004 | Filippini et al. ............ 510/201 |

OTHER PUBLICATIONS

Crafton, J.W., Oil and Gas Well Evaluation Using the Reciprocal Productivity Index Method, Article No. SPE 37409, 1997.
Limanowka, W.A. et al., Asphaltene Deposition Problems in Oil Industry with Focus on Electric Submersible Pump Applications, Article No. SPE 56662, 1999.
Carbognani, L. et al, Physicochemical Characterization of Crudes and Solid Deposits as a Guideline to Optimize Oil Production, Article No. SPE 64993, 2001.
Griffin, Jonas M, An Approach to Mitigating Wellbore Solids, Abstract No. 71588, 2001.

* cited by examiner

*Primary Examiner*—William Neuder
(74) *Attorney, Agent, or Firm*—Roy, Kiesel, Keegan & DeNicola

(57) ABSTRACT

The addition of one or more stimulants to a petroleum well in order to enhance the production of the well. If the well is suffering from asphaltene or paraffin build up, the well may be heated either chemically or with steam prior to introduction of the stimulant. Additionally, a solvent may be added to dissolve the asphaltenes and paraffins. The stimulants are allowed to soak into the formation and then the well is returned to production. The stimulants increase the ability of oil to flow through the formation and decrease the ability of water to flow through the formation by coating the water wet portions of the formation with oil soluble chemicals. The stimulants also decrease the viscosity of the oil in formation.

41 Claims, 1 Drawing Sheet

METHOD FOR STIMULATING A PETROLEUM WELL

BACKGROUND OF THE INVENTION

1. Field of the Invention

The invention relates to the stimulation of petroleum wells in general and to the stimulation of oil wells in particular.

2. Prior Art

Petroleum wells typically comprise a well bore bordered by a casing. One or more production lines are positioned within the casing so that the petroleum may be carried to the surface. In the petroleum bearing portion of the formation, the casing will be perforated to allow the oil to flow into the well and be pumped up the production line. These perforations are typically done by piercing the casing with specially configured bullets, small charges, highly compressed air or other fluids, or a variety of other well known prior art methods. When the casing is initially punctured, there will typically be several perforations made to facilitate the flow of oil into the well at various points in the formation.

Unfortunately, many oil bearing strata also contain water. Of course, the petroleum will float atop the water. Thus, the upper perforations will allow oil to flow into the well while the lower perforations will often allow water to flow into the well, all of which must then be brought to the surface, where the oil can be separated from the water.

Raising the water is obviously undesirable. First, there is an expense associated with running the pump to lift the water. Every gallon of water raised represents a cost that cannot be recouped. More importantly each gallon of water raised also represents a gallon of oil that was not produced on that day. Wells that produce a high volume of water per day relative the amount of oil produced are obviously not very efficient.

The amount of water produced by a well can change over time. One way this is believed to occur is through "water coning." As the oil and water flow through the formation, they will wet the sands in the vicinity of the well. As the water flows through sands, it will climb the outside of the casing, displacing the oil. Thus, over time, the formation may change from a configuration similar to the one shown in FIG. 1A to one more similar to the configuration shown in FIG. 1B.

As the water rises around the well casing, it will cover the perforations that previously allowed petroleum to flow into the well. Water and oil are generally immiscible, so the water will effectively prevent petroleum from flowing through the covered perforations. This will reduce the number of perforations through which the petroleum can flow, which will reduce the barrels of oil produced by the well per day (bopd) and simultaneously increase the barrels of water produced by the well per day (bwpd). Thus, water coning can reduce the petroleum output of a well and simultaneously increase the cost of production, as more water must be lifted for each barrel of petroleum.

A second problem for many petroleum wells, particularly those producing heavy crudes, i.e. those whose average API gravity is below about seventeen degrees, is viscosity. Such heavy crudes can be difficult to pump because of their high viscosities and can cause pressure in the production line to rise, making pumping more difficult. This can damage and cause premature wearing in well equipment, increasing the cost of production. Such viscosity problems are commonly addressed by pumping a diluent—any lower API gravity oil—down hole so that it can mix with the oil in the well. This is obviously inefficient, since what is pumped down must be pumped back up. Therefore, the use of diluents is preferably minimized. Accordingly, a well stimulant meeting the following objectives is desired.

OBJECTS OF THE INVENTION

It is an object of the invention to increase the number of barrels of petroleum produced per day from a well.

It is another object of the invention to decrease the number of barrels of water produced per day from a well.

It is yet another object of the invention to maximize the number of well perforations allowing petroleum into a well.

It is still another object of the invention to decrease the viscosity of oil being pumped from heavy grade petroleum wells.

It is yet another object of the invention to reduce the amount of diluent needed for production of heavy grade petroleum wells.

SUMMARY OF THE INVENTION

The preferred embodiment of the invention comprises the addition of one or more stimulants to a petroleum well in order to enhance the production of the well. If the well is suffering from asphaltene or paraffin build up, the well may be heated—preferably with steam—prior to introduction of the stimulant. Additionally, a solvent may be added to dissolve the asphaltenes and/or paraffins. The stimulants are allowed to soak into the formation and then the well is returned to production.

DETAILED DESCRIPTION OF THE PREFERRED EMBODIMENT

Figures 1A, 1B:
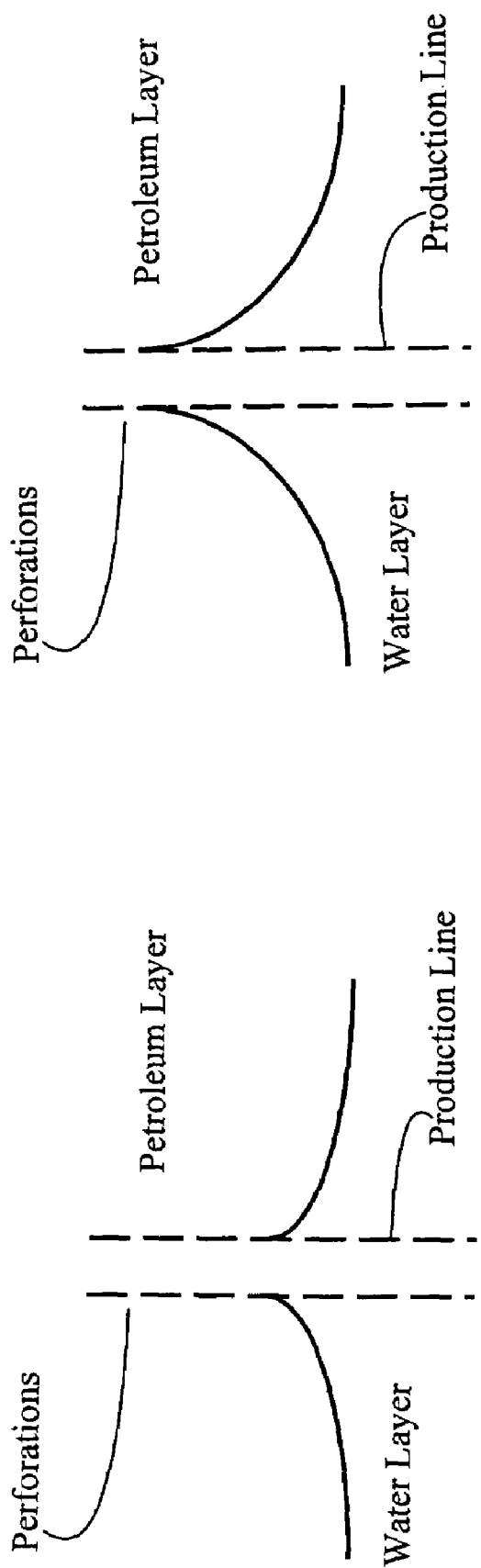
FIG. 1A is an exemplary drawing illustrating the relative positions of petroleum and water in a petroleum well early in the life of the well.
FIG. 1B is an exemplary drawing illustrating the relative positions of petroleum and water in a petroleum well after the well has been in production for some time.

The invention comprises the addition of stimulants and, in some cases, a solvent to petroleum well formations in order to stimulate production from the well. Injecting stimulants into a petroleum formation is well known in the art. See, e.g., U.S. Pat. No. 4,844,158. Accordingly, the injection process will only be briefly described. In the preferred application, the well will be treated with steam prior to the addition of the stimulants of the present invention. The treatment of petroleum wells with steam is a common technique in the prior art, and will also not be discussed in detail herein. See, e.g., U.S. Pat. No. 2,862,558. The well should preferably be allowed to cool after steam treatment before stimulants or solvents are added. Eighteen to forty-eight hours will generally be long enough for the well to return to its ambient temperature.

In wells where the build up of petroleum deposits, such as asphaltene and paraffins, are believed to be affecting production in the well, a solvent may be added. The solvent will primarily remove the mineral deposits from the formation passages by dissolving the deposits, thereby increasing the size of the passages and increasing flow rate. The preferred solvent is a blend containing at least about fifty percent by volume dipentene and at least about fifty percent by volume diesel.

Subsequent to the addition of a solvent, when one is used, a first stimulant will generally be added to the well. Injection of all the fluids discussed herein may be performed by pumping them down the annulus between the casing and the production line or they may be pumped down the production line itself. In the preferred embodiment, the first stimulant will comprise at least about fifteen percent by volume pentene or preferably dipentene; at least about fifteen percent by volume 2 ethyl hexanol; and at least about thirty percent by volume of ethoxylated linear alcohols. The alcohols serve as non-ionic surfactants. The preferred source of the ethoxylated linear alcohols is the BASF Corporation's Macol® LA 12 (CAS # 68551-12-2). BASF is located in Mount Olive, N.J. BASF's Macol has the formula $RO(CH_2CH_2O)_nH$ where R is a linear alcohol having between 9 and 15 carbons and ethylene oxide will comprise from about 18.5 percent to about 71.5 percent by weight of the molecule.

The first stimulant will also preferably include at least about ten percent by volume of a product formed from the reaction of alpha olephin having a molecular weight of about 18 to about 24 with maleic anhydride in the presence of a catalyst. The preferred method reacting the alpha olephin with maleic anhydride is described below as the first stage of the second stimulant.

The first stimulant will also preferably include at least about ten percent by volume of a solvent comprised of petroleum naphtha, isopropyl benzene, and vinyl acetate. The naphtha will preferably comprise about eighty to ninety-five percent by weight of the solvent. The isopropyl benzene will preferably comprise about 4.4 percent by weight of the solvent and the vinyl acetate will preferably comprises less than about 1 percent by weight of the solvent and most preferably about 0.8 percent by weight of the solvent. In the preferred application, the inventor obtains the solvent under the brand name Lubrizol® 8052J from the Lubrizol Corp. of Wickliffe, Ohio. In addition to the foregoing ingredients, the Lubrizol product contains several trimethyl benzene compounds as well as xylene and ethyl benzene, which together comprise about thirty-five to fifty percent by weight of the Lubrizol product. The inventor distills the Lubrizol product to remove the xylene, ethyl benzene, and the trimethyl benzene compounds. The primary effect of this distillation is to render the distillate combustible rather than flammable, which makes the product safer and less expensive to transport.

The first stimulant will also preferably contain at least about twenty percent by volume of a surfactant. The preferred surfactants are sold under the brand names Dissolvan 3245 and Dissolvan V2820 by the Clariant Corp. of Charlotte, N.C. Each surfactant is comprised of propylene oxide and ethylene oxide polymers in a naphtha solvent, and each makes up about half of the surfactant in the first stimulant.

After the first stimulant is added to the well, a second stimulant is preferably added. The order may be reversed if desired. Moreover, the order typically will be reversed when a solvent is added to the well first. That is, when a solvent is injected into the well, the second stimulant will preferably be added first.

The second stimulant is prepared in stages. In the first stage, alpha olefin ($RCH:CH_2$ where R is a carbon chain having 18–24 carbons) is reacted with maleic anhydride, $C_4H_2O_3$. The alpha olefin, available from Chevron or Shell and sold under the trade name Gulftene. 20–24 (CAS #'s 93924108, 3452071, 1599673, 10192322, 112889, 18835331), comprises about eighty-six percent of the stage 1 formulation by weight and the maleic anhydride comprises about thirteen percent. Tertiary-butyl peroxybenzoate ($C_{11}H_{14}O_3$), sold as Esperox 10 (CAS # 614-45-9) by the Argus division of Witco Chemical, whose principle offices are at One American Lane, Greenwich, Conn., serves as a catalyst in the reaction. Esperox 10 makes up less than one percent (1%) and preferably about three tenths of one percent (0.3%) of the reactant mixture.

The alpha olefin is heated in a covered water/steam bath to 120° F. for 16 hours, or 24 hours if ambient temperature is less than 46° F. This should melt the alpha olefin. The maleic anhydride is added next. After it is added, the mixture is heated to 140° F. At 140° F., the tertiary-butyl peroxybenzoate is added slowly—about 4.2 pounds per half hour. The mixture is then heated to 300° F. for three to five hours. The product of stage 1 is a co-polymer that cools to a waxy solid.

In the second stage, a polyether ($RCH_2COCH_3CH_2$) sold under the name Poly Pro (CAS # 009082-00-2) by Satellite International of Victoria, Tex., is reacted with maleic anhydride in the presence of the catalyst, tertiary-butyl peroxybenzoate ($C_{11}H_4O_3$) (Esperox 10). The polyether polyol constitutes ninety-two percent (92%) of the mixture by weight, the maleic anhydride constitutes eight percent (8%) by weight, and the tertiary-butyl peroxybenzoate (Esperox 10) constitutes one hundredth of one percent (0.01%) by weight. The polyether polyol and maleic anhydride are added to a vessel and heated to 158° F. They should be agitated during heating. At 158° F. the tertiary-butyl peroxybenzoate (Esperox 10) should be added over twenty minutes. The temperature should then be increased to 266° F. for four hours. The product of stage 2 is a liquid.

In stage 3, the product of stage 1 is reacted in the presence of the catalyst Esperox 10 with a long chain alcohol sold under the name Alfol 20+ by Sasol, Ltd. (formerly, the Condea Vista Company) a South African company having its U.S. headquarters in Houston, Tex. The product is mixed with 2 ethyl hexanol ($C_8H_{18}O$) (CAS# 104-76-7) sold by the Eastman Chemical Company of Kingsport, Tenn. Alfol 20+ is a combination of two alcohols: $RCH_2CH_2CHO$ and $R(CHCH_3)CHO$, where R is a carbon chain with twenty or more carbons.

In stage 3, the product of stage 1 comprises forty percent (40%), by weight, of the reactive mixture, the Alfol 20+ also comprises forty percent (40%) by weight, and the 2 ethyl hexanol comprises the remaining 20 percent (20%) by weight of the reactive mixture. The Esperox 10 comprises about one hundredth of one percent (0.01%). The product of stage 1 and the Alfol 20+ are melted, then the Esperox 10 catalyst is added and then the 2 ethyl hexanol is added. The mixture should then be heated to 200° F. for thirty minutes to an hour. The product of stage 3 will be a hard waxy solid upon cooling.

In stage 4, 4-isopropenyl-1-methylcyclohexane ($C_5H_8$), a dipentene sold as D-limonene (CAS # 005989-27-5) by HCI USA Distribution Companies of St. Louis, Mo.; mineral seal oil (CAS # 064741-44-2), also sold by HCI USA Distribution Companies of St. Louis, Mo.; the product of stage 3; and the product of stage 1 are mixed together. Although dipentene is preferred, pentene could be used here as well. The pentene or dipentene and mineral seal oil are both added to a mixing vat. The mineral oil serves as a carrier so other light distillates (preferably $C_8$–$C_{16}$) such as diesel could be used. The products of stage 3 and stage 1 are both melted and then added to the dipentene-mineral seal oil combination and mixed. The dipentene makes up about thirteen percent (13%) by volume of the stage 4 mixture; the mineral seal oil makes up about twelve percent (12%) by volume of the mixture; the product of stage 3 makes up about twenty three percent (23%) by volume of the mixture; and the product of stage 1 makes up about fifty-three percent (53%) by volume of the mixture. The product of stage 4 is a liquid, although it can harden when left standing, such that melting may be necessary before the product of stage 4 can be used. No reaction is believed to take place in stage 4.

In stage 5, the products of stage 4; dodecylbenzylsulfonic acid (DDBSA) (CAS # 27176-87-0); a pentene or dipentene, preferably the D-limonene product mentioned above; the product of stage 2; Clariant D 3245; and 2 ethyl hexanol are mixed together. Clariant D3245 is a surfactant made by the Clariant corporation of 3597 Collection Center Dr.; Chicago, Ill. 60693.

In stage 5, about fifty-two percent (52%) by volume of the product of stage 4 is first placed in a mixing container. If the product of stage 4 has hardened, it should be melted. Next, about fourteen percent (14%) by volume DDBSA is added. Next, about eleven percent (11%) by volume dipentene is added while mixing. This portion of the process is exothermic—temperatures will reach 350° F., so caution should be exercised. About eight percent (8%) by volume of the product of stage 2 is then added and mixed. Next, about five percent (5%) by volume of the Clariant D 3245 is added and mixed. Clariant D 3245 prevents the formation of emulsions in the stimulant. Finally, about one percent (1%) by volume of 2 ethyl hexanol is added and mixed. The product of stage 5 is a brown liquid. The DDBSA and pentene or dipentene definitely react. The inventor believes the remainder of the ingredients in stage 5 merely form part of the preferred mixture.

The second stimulant is preferably comprised of a blend of the product of stage 5, the product of stage 1, the product of stage 2, 2 ethyl hexanol, and a surfactant—preferably Clariant D 3245. The preferred concentrations of the components of the second stimulant are about sixty-five percent (65%) by volume of the product of stage 5, about twenty-three percent (23%) by volume of the product of stage 1, about eight percent (8%) by volume 2 ethyl hexanol, about two percent (2%) by volume of the product of stage 2, and about two percent (2%) by volume of the surfactant. The order of mixing the ingredients of the second stimulant are not expected to alter their efficacy.

A buffer, preferably diesel or lease crude (petroleum previously extracted from the well), is pumped into the well prior to, between, and after each application of each stimulant. However, the second stimulant will preferably follow immediately behind the solvent without a buffer when the solvent is used. The application of the first and second stimulants with intervening buffers may be repeated as many times as needed. In the preferred application, the goal is to introduce enough of the total stimulant, buffer, and—if applicable—solvent solution into the formation to fill a cylinder having a four to five foot radius centered on the production line. The amount of solution needed will depend upon the length of the production line in the production zone. Generally, this will correspond to the number of perforation in the production line. However, if less than all of the formation corresponding to the perforated portion of the production line is to be treated, wash cups may be inserted into the line to limit where the solution may exit the line. The amount of solution needed will also depend upon the permeability of the formation. The greater the permeability, the more solution will be required.

The actual amounts needed will vary from well to well. However, by way of example, in one well which was not treated with solvent, the treatment regimen was 3 bbl (1 bbl=42 gal) diesel
1 drum (1 drum=55 gal) first stimulant
3 bbl diesel
1 drum second stimulant
3 bbl diesel
1 drum first stimulant
5 bbl diesel.

The treatment zone in the foregoing well was 137 feet in length.

In another example, wherein the well was first treated with a solvent, the treatment regimen was 4 drums solvent (diesel dipentene blend)
1 drum second stimulant
4 bbl diesel
9 drums first stimulant
4 bbl diesel
1 drum second stimulant
8 bbl diesel.

Immediately after the solution has been injected into the production line, about 1000 to 1200 bbl of steam/water should preferably be pumped into the well to force the solution out of the production line and into the formation. Of course, the amount of steam/water needed will depend upon the length of the production line.

The injection rate should preferably be about one to about one and a half bbl per minute and no faster than two barrels per minute. Faster pumping could result in the well's gravel pack being forced into the formation, and the formation itself being broken—note that in some instances, mechanical formation breakage may be desired, and in such instances higher pump rates may be acceptable. When the stimulants reach the boundary between the well casing and the formation, pumping should preferably be slowed to ¼ barrel per minute. When mechanical fracturing is not desired, pump pressures should be maintained below the fracture point of the formation matrix. The fracture point will vary from matrix to matrix; however, pump gauge pressures of between 1200 and 2500 pounds per square inch (psig), and most preferably less than 2000 psig, will be acceptable in most instances.

After completion of the injection, the well should be allowed to sit for a minimum of twenty-four to forty-eight hours. Allowing the well to sit will allow the well to cool to its ambient temperature. It will also allow the polymers in the solution to adhere to the water wet matrix in the formation. To facilitate the absorption of the solution by the formation, the well may be pressurized to about 500 pounds per square inch and then depressurized prior to the soak in period.

During treatment, it is believed that the stimulants will coat the sands and/or carbonates in the formation. The stimulants are oil soluble and are dispersible in both water and oil. However, they are not water soluble. The stimulants' dispersibility will allow it to be injected into the sands and carbonates in both oil bearing portions of the formation and in water bearing portions of the formation. However, sands and carbonates in the water bearing portion of the formation that become coated with the stimulant will create an oil/water interface, which will inhibit the flow of water through such materials. No similar inhibitive effect will arise between sands and carbonates coated with the stimulant and the petroleum in the formation. Thus, the petroleum will flow more readily through the formation than will water, after treatment. This will help counteract water coning and, by displacing the water, open more of the perforations to the flow of petroleum. Additionally, the stimulant facilitates the wettability of formation materials with oils.

By coating the sands in the formation with the stimulant, a continuing source of stimulant to the petroleum flowing from the well is provided. Introduction of the stimulants to the oil will substantially reduce the oil's viscosity. Thus, as the flowing petroleum picks up the stimulants, the viscosity of the petroleum exiting the well will be reduced. This will make pumping easier and will increase the flow rate of the well. Accordingly, the stimulant will continue to enhance the flow rate of the well over time.

Because the stimulant will mix with the flowing petroleum, the concentration of the stimulant in the formation will diminish with time. However, the rate of diminution will not be uniform in all regions of the formation. Significantly, the stimulant deposited in the water bearing portions of the formation will be removed more slowly than the stimulant in the oil bearing portion because of its insolubility in water. Thus, the stimulant deposited in the water bearing portions of the formation can be expected to continue inhibiting the flow of water long after the stimulant deposited in the oil bearing portion of the formation has been completely absorbed by the petroleum stream.

In addition to the foregoing, the stimulants will disperse asphaltenes. This will help remove asphaltene deposits that may be impeding flow within the formation. Additionally, by keeping the asphaltenes dispersed, the stimulants will help prevent the reformation of deposits in the formation after treatment.

After the soak in period, the (by then) cooled steam/water will be pumped back out the production line. It should be noted that a spacer should be present between the steam/water head and the final stimulant. Morever, the head of steam/water should push the solution into the formation but should not enter the formation itself. One of the overall goals of the invention is to displace water from the formation or at least coat the water wet portions of the formation with oil soluble polymers. It would be counter-productive to pump water back into the formation. Once the water is pumped out, the well can be returned to production.

Improvement of about thirty to three hundred percent (30–300%) in barrels of oil per day per well can be expected after treatment. Moreover, a reduction of about fifteen to sixty percent (15–60%) in barrels of water per day per well can also be expected after treatment.

Other uses and embodiments of the invention will occur to those skilled in the art from the foregoing disclosure, and are intended to be included within the scope and spirit of the claims which follow.

I claim:

1. A method of stimulating the production of a petroleum well comprising:
   pumping a first stimulant into the well, wherein said first stimulant comprises dipentene; ethoxylated linear alcohol; a solvent comprised of naphtha; a product formed from the reaction of alpha olephin with maleic anhydride; and a surfactant, and
   pumping a second stimulant into the well, said second stimulant comprising: a product formed from the reaction of alpha olephin with maleic anhydride; a product formed from the reaction of polyether with maleic anhydride; a product formed from the product of alpha olephin and maleic anhydride further reacted with a long chain alcohol selected from the group comprising $RCH_2CH_2CHO$ and $R(CHCH_3)CHO$ and mixtures thereof; a product formed from the reaction of dodecylbenzene sulfonic acid with a pentene; 2 ethyl hexanol; 4-isopropenyl-1-methylcyclohexane; and a surfactant.

2. A method of stimulating the production of a petroleum well according to claim 1 wherein said dipentene comprises at least about fifteen percent by volume of said first stimulant.

3. A method of stimulating the production of a petroleum well according to claim 2 wherein said ethoxylated linear alcohol is a non-ionic surfactant.

4. A method of stimulating the production of a petroleum well according to claim 3 wherein said ethoxylated linear alcohol comprises at least about thirty percent by volume of said first stimulant.

5. A method of stimulating the production of a petroleum well according to claim 4 wherein said ethyl hexanol comprises at least about fifteen percent by volume of said first stimulant.

6. A method of stimulating the production of a petroleum well according to claim 5 wherein said solvent further comprises isopropyl benzene, and vinyl acetate.

7. A method of stimulating the production of a petroleum well according to claim 6 wherein said solvent comprises at least about ten percent by volume of said first stimulant.

8. A method of stimulating the production of a petroleum well according to claim 7 wherein said product of alpha olephin and maleic anhydride comprises at least about ten percent by volume of said first stimulant.

9. A method of stimulating the production of a petroleum well according to claim 1 wherein said surfactant comprises propylene oxide and ethylene block polymers.

10. A method of stimulating the production of a petroleum well according to claim 1 where R is a carbon chain with at least twenty carbons.

11. A method of stimulating the production of a petroleum well according to claim 1 where said pentene is a dipentene.

12. A method of stimulating the production of a petroleum well according to claim 1 wherein said second stimulant further comprises a demulsifier.

13. A method of stimulating the production of a petroleum well according to claim 1 further comprising pumping a solvent solution into the well, said solvent solution comprising dipentene and diesel.

14. A method of stimulating the production of a petroleum well according to claim 13 wherein said solvent solution comprises about fifty percent by volume dipentene and about fifty percent by volume diesel.

15. A method of stimulating the production of a petroleum well according to claim 13 wherein said solvent solution is pumped into the well before said first or said second stimulant is pumped into the well.

16. A method of stimulating the production of a petroleum well according to claim 15 wherein a spacer is pumped into the well between said first stimulant and said second stimulant.

17. A method of stimulating the production of a petroleum well according to claim 16 wherein said spacer is diesel.

18. A method of stimulating the production of a petroleum well according to claim 1 wherein a spacer is pumped into the well between said first stimulant and said second stimulant.

19. A method of stimulating the production of a petroleum well according to claim 1 further comprising pumping a solvent solution into the well, said solvent solution comprising dipentene and diesel.

20. A method of stimulating the production of a petroleum well according to claim 19 wherein said solvent solution comprises about fifty percent by volume dipentene and about fifty percent by volume diesel.

21. A method of stimulating the production of a petroleum well according to claim 20 wherein said solvent solution is pumped into the well before said first stimulant is pumped into the well.

22. A method of stimulating the production of a petroleum well according to claim 19 wherein a spacer is pumped into the well between said first stimulant and said solvent solution.

23. A method of stimulating the production of a petroleum well according to claim 22 wherein said spacer is diesel.

24. A method of stimulating the production of a petroleum well according to claim 1 wherein said well is heated with steam prior to the introduction of said stimulant.

25. A method of stimulating the production of a petroleum well according to claim 1 wherein said well is heated with hot water prior to the introduction of said stimulant.

26. A method of stimulating the production of a petroleum well according to claim 1 wherein the well is in a formation and wherein a displacement fluid selected from the group comprising water and steam is pumped into the well, whereby the first and second stimulant may be forced into the formation.

27. A method of stimulating the production of a petroleum well according to claim 26 wherein said well is allowed to cool before returning said well to production.

28. A method of stimulating the production of a petroleum well comprising:
pumping a stimulant into the well, said stimulant comprising:
a product formed from the reaction of alpha olephin with maleic anhydride; a product formed from the reaction of polyether with maleic anhydride; a product formed from the product of alpha olephin and maleic anhydride further reacted with a long chain alcohol selected from the group comprising $RCH_2CH_2CHO$ and $R(CHCH_3)CHO$ and mixtures thereof a product formed from the reaction of dodecylbenzene sulfonic acid with a pentene; 2 ethyl hexanol; 4-isopropenyl-1-methylcyclohexane; and a surfactant.

29. A method of stimulating the production of a petroleum well according to claim 28 where R is a carbon chain with at least twenty carbons.

30. A method of stimulating the production of a petroleum well according to claim 29 where said pentene is a dipentene.

31. A method of stimulating the production of a petroleum well according to claim 30 wherein said stimulant further comprises a demulsifier.

32. A method of stimulating the production of a petroleum well comprising:
pumping a stimulant into the well, said stimulant comprising:
a product formed from the reaction of dodecylbenzene sulfonic acid with a pentene.

33. A method of stimulating the production of a petroleum well according to claim 32 wherein said stimulant further comprises a product formed from the reaction of alpha olephin with maleic anhydride.

34. A method of stimulating the production of a petroleum well according to claim 32 wherein said stimulant further comprises a product formed from the reaction of polyether with maleic anhydride.

35. A method of stimulating the production of a petroleum well according to claim 32 wherein said stimulant further comprises a product formed from the product of alpha olephin and maleic anhydride further reacted with a long chain alcohol selected from the group comprising $RCH_2CH_2CHO$ and $R(CHCH_3)CHO$ and mixtures thereof.

36. A method of stimulating the production of a petroleum well according to claim 35 where R is a carbon chain with at least twenty carbons.

37. A method of stimulating the production of a petroleum well according to claim 32 wherein said stimulant further comprises 2 ethyl hexanol.

38. A method of stimulating the production of a petroleum well according to claim 32 wherein said stimulant further comprises 4-isopropenyl-1-methylcyclohexane.

39. A method of stimulating the production of a petroleum well according to claim 32 wherein said stimulant further comprises a surfactant.

40. A method of stimulating the production of a petroleum well according to claim 32 where said pentene is a dipentene.

41. A method of stimulating the production of a petroleum well according to claim 32 wherein said stimulant further comprises a demulsifier.

* * * * *